(12) United States Patent
Vogel (10) Patent No.: US 6,757,908 B1
(45) Date of Patent: Jun. 29, 2004

(54) GRAPHICAL REPRESENTATION OF IMPAIRMENT OR OTHER CONDITIONS IN A DATA-OVER-CABLE SYSTEM

(75) Inventor: Mark O. Vogel, Hampshire, IL (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/322,833

(22) Filed: May 28, 1999

(51) Int. Cl.⁷ .............................................. H04N 7/173
(52) U.S. Cl. ...................................... 725/107; 725/111
(58) Field of Search ................................. 725/107, 111, 725/143, 144, 148, 124, 125, 126; 348/192, 193; 370/241, 242, 247, 251; 324/613, 614

(56) References Cited

U.S. PATENT DOCUMENTS

| | | | | |
|---|---|---|---|---|
| 3,599,217 A | * | 8/1971 | Grant ....................... | 343/792.5 |
| 5,559,527 A | * | 9/1996 | Quinn ....................... | 455/67.7 |
| 5,939,887 A | * | 8/1999 | Schmidt et al. ............. | 324/628 |
| 6,385,773 B1 | * | 5/2002 | Schwartzman et al. ..... | 725/124 |

OTHER PUBLICATIONS

Data–Over–Cable–Service Interface Specifications (DOCSIS)—Radio Frequency Interface Specification Interim Specification SP–RFI–104–980724, Jul. 24, 1998, issued by Cable Television Laboratories, Inc.

* cited by examiner

*Primary Examiner*—Andrew Faile
*Assistant Examiner*—Andrew Y Koenig

(74) *Attorney, Agent, or Firm*—McDonnell Boehnen Hulbert & Berghoff (57) ABSTRACT

Impairment or other conditions (e.g., signal to noise ratio or noise floor) in a data-over—cable system are represented graphically in an easy to use and comprehensible manner, enabling quick identification and isolation of the source of the impairment. The graphical representation of the condition, referred to herein as an "impairment circle", is in the form of a circular template with a line segment superimposed thereon representing the impairment. One end of the line segment is placed on the perimeter of the circle at a location associated with a particular cable modem or channel. The other end of the line segment either terminates in the interior of the circle or terminates on another portion of the perimeter. The perimeter of the circle can be divided into multiple sections, each section representing a channel in a transmission path. The sections can be further divided into multiple divisions, each division corresponding to a particular cable modem in the path or number of occurrences. In one type of the impairment circle, the location in which the line segment terminates within the interior of the circle indicates the magnitude of the impairment or other measurement. A single impairment circle can be used to represent impairments or other measurements of multiple channels and multiple cable modems. In another type of impairment circle, the line segment goes from one division of one section to another division of another section, indicating a condition of impairment of other channels when a particular cable modem in one channel is active. Different colors for the line segments and different widths of the line segments can convey additional information, such as the number of occurrences of the condition, or the magnitude of the impairment.

22 Claims, 6 Drawing Sheets

(1 of 6 Drawing Sheet(s) Filed in Color)

GRAPHICAL REPRESENTATION OF IMPAIRMENT OR OTHER CONDITIONS IN A DATA-OVER-CABLE SYSTEM

BACKGROUND OF THE INVENTION

A. Field of the Invention

This invention relates to the field of data communication and data-over-cable systems. More particularly, the invention relates to a method of graphically representing conditions in such a system (such as signal to noise ratio, noise floor levels, or other types of conditions, which may or may not indicate an impairment in the system) in a convenient manner such that the source of the impairment to the system is easy to comprehend by a technician or human operator.

B. Description of Related Art

Cable modem systems for wide area network access, e.g., Internet access, are now being rolled out in selected metropolitan areas of the United States. Basically, these systems provide high-speed data communications over a cable television infrastructure. Background information related to cable modem systems in general is described in the Data-Over-Cable Service Interface Specifications (DOCSIS)—Radio Frequency Interface Specifications, Interim Draft, dated Jul. 24, 1998, issued by Cable Television Laboratories, Inc. This document, known to persons working in the art, is incorporated by reference herein in its entirety.

Figure 1:
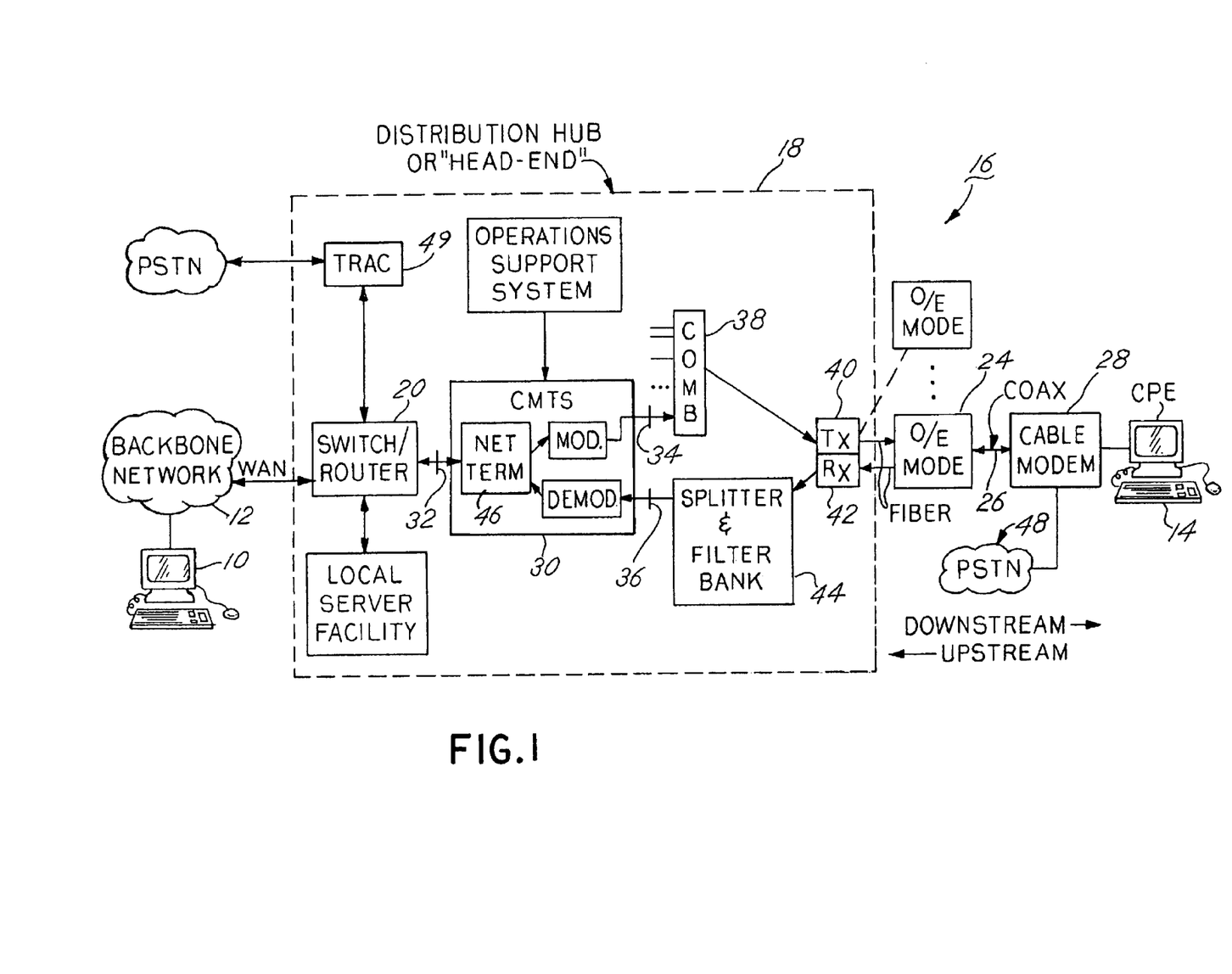
FIG. 1 is a schematic illustration showing a cable modem system of the type in which the invention may be practiced.

The basic overall architecture of a data over cable system is shown in FIG. 1. The system of FIG. 1 provides a mechanism by which a computer 10 connected to a backbone network 12 (either directly or indirectly by intermediate networks) may communicate with another computer 14 via a cable television infrastructure indicated generally by reference numeral 16. The cable television infrastructure 16 includes a distribution hub or "head-end" 18 that is connected to the backbone network 12 via a wide area network and a switch or router 20. A cable system head-end is a central location in the cable television network that is responsible for sending cable signals in the downstream direction. The head-end 18 modulates digital data into analog form and supplies analog signals to a fiber network 22, which is connected to a plurality of O/E nodes 24. The O/E nodes 24 convert optical signals in the fiber network 22 to electrical signals for transmission over a coax cable network 26 to a cable modem 28 at the customer's location. The cable modem 28 demodulates the analog signals and extracts the digital data and supplies the data to the customer promises equipment 14, which, in a typical situation, is a general purpose computer in a home environment.

The head-end 18 includes a cable modem termination system or CMTS 30. This device provides a network side interface to a wide area network, indicated at 32, and an RF interface between the cable modem termination system and the cable network in both the downstream and upstream directions, indicated at 34 and 36. The term "downstream", as used in the present document, refers to transmission in the direction from the head-end 18 or cable modem termination system 30 to the cable modem 28 at the customer premises. The term "upstream" refers to transmission in the direction from the cable modem 28 at the customer premises to the cable modem termination system 30.

For transmission in the downstream direction, the CMTS 30 supplies data from the computer 10 to a modulation circuit MOD and to a combiner 38, where the data is combined with video signals for the cable television system. The combined signals are sent to a transmission module 40 where they are imparted onto the fiber network. In the receiving direction, data from the CPE 14 is received from the fiber network at a receive module 42, sent to a splitter and filter bank 44 and sent to a demodulation circuit DEMOD in the CMTS 30. The data is processed by a network termination unit 46, sent to the switch or router 20 and routed onto the WAN for transmission to the remote computer 10.

Many cable television networks provide only unidirectional cable systems, supporting only a "downstream" cable data path. A return data path via a telephone network (i.e., a "telephony return"), such as a public switched telephone network provided by AT&T, GTE, Sprint, MCI and others, is typically used for an "upstream" data path. A cable television system with an upstream connection to a telephony network is called a "data-over-cable system with telephony return." Such a return system is indicated at 48 where the cable modem 28 is also shown connected to the public switched telephone network (PSTN).

An exemplary data-over-cable system with telephony return includes customer premises equipment (e.g., a customer computer), a cable modem, a cable modem termination system, a cable television network, a public switched telephone network, a telephony remote access concentrator (TRAC 49 in. FIG. 1) and a data network 12 (e.g., the Internet). The cable modem termination system 30 and the telephony remote access concentrator 49 together are called a "telephony return termination system."

In a two-way cable system without telephony return, the customer premises equipment 14 sends data packets to the cable modem 28, which sends the data packets upstream via the cable television network 22 and 26 to the cable modem termination system 30. Such as system is shown in FIG. 1. The cable modem termination system 30 sends the data packets to appropriate hosts on the data network 12. The cable modem termination system 30 sends the response data packets back to the appropriate cable modem 28.

In a two-way cable system without telephony return, the cable modem termination system 30 can continuously collect information about the level of impairments or other conditions, such as noise floor level, on the upstream RF path of a cable plant, i.e., the portion of the network between the demodulation circuit in the CMTS 30 and the cable modems 28. Further, a single O/E node 24 may serve multiple channels and cable modems. Measurements such as the noise floor level, and signal-to-noise ratio per cable modem transmission, can be made for the coax and fiber networks, along with the tracking of which cable modems are active during a given measurement interval. However, in order for the collected data to be useful, there must be a method of correlating impairments with upstream channels, cable modems, and impairment levels in order for the user (e.g., technician or cable system operator) to ascertain what the cause of the particular impairment is. This problem of correlation is further complicated if there are intermittent, or multiple, impairments on a given upstream path, or across multiple upstream channels.

Unfortunately, the collected impairment data does not lend itself well to plotting on standard format graphs. A tabular presentation of impairment data can involve a significant amount of work by the user to interpret results, and do so in an expeditious manner. Thus, there has been a need in the art for a new method of presenting the impairment data that will allow the user to quickly analyze the data and determine what the cause or causes of the impairments are. The standard way of presenting impairment data or other conditions in a data over cable transmission path is to show the RF spectrum in the channel being monitored with a spectrum analyzer. There are several drawbacks with this approach. First, the method is costly, as in order to get the resolution that is required a separate device is used for data collection. In many cases, the data collection device is limited in how many channels it can monitor. Secondly, the method gives the provider or user no information on active cable modems that may be the cause of the problem. Thirdly, it does not sufficiently narrow down the problem to enable quick troubleshooting of the cause of the impairment. The present invention overcomes these problems.

SUMMARY OF THE INVENTION

A method of presenting impairment data in a cable modem system in a useable, easy to understand graphical form is described herein. I have adopted the term "impairment circle" to refer to the graphical representation of the impairment data provided by the method. The impairment circle consists of a circular template, with a line segment superimposed thereon that conveys some information about the impairment or condition being measured. For example, the line segment can represent the magnitude of the impairment or condition being measured. The line segment can also represent the number of occurrences of the impairment during a user defined time period. In another type of impairment circle, the line segment is used to identify cable modems that happen to be active in one or more channels when the impairment is measured, and thus is a tool for isolating which cable modem in which channel is the source of the impairment. Thus, several different types of impairment circles are contemplated.

The perimeter of the impairment circle may be partitioned into a number of small divisions. Depending on the type of impairment circle, the small divisions can represent either individual cable modems, or the number of occurrences of an upstream impairment.

In addition, the impairment circles may have concentric rings centered on the center of the circle, which provide a scale for the line segment superimposed on the circle. For example, the line segment may extend from the perimeter of the circle to the second of three concentric circles, indicating that the magnitude of the impairment that is being measured is equal to the level or magnitude represented by the second concentric circle. The impairment being measured could be conditions such as signal to noise level or noise floor during a period of quiescence in the channel, for example when there are no modems transmitting in the upstream direction during the measurement interval.

In one possible embodiment, an impairment circle is provided which graphically represents impairments across multiple channels on a common upstream path. In this embodiment, the impairment circle is divided into pie-shaped sections. Each section will have the cable modem or occurrence divisions, but they will be for the particular channel that the section represents.

The method, in accordance with a primary aspect of the invention, is a way of presenting impairment data for a data-over-cable system. The method involves, the step of making a measurement of an impairment or condition on a channel of a cable modem transmission path. Then, the measurement is represented as a line segment in an impairment circle having a perimeter and a center. The line segment has a first end on the perimeter of the impairment circle and a second end within the area bounded by the perimeter, and wherein the location of the second end of the line segment within said circle indicates the magnitude of the measurement or impairment.

As an example, the measurement may be made of the signal to noise ratio of a particular upstream channel in the transmission path. The first end of the line segment is on the perimeter of the impairment circle at a location that corresponds to a particular modem in the channel. The second end of the line segment is preferably oriented in a direction towards the center of the circle and terminates at a distance from the perimeter indicative of the magnitude of the signal to noise ratio. The impairment circle provides a very easy to use tool to understand the measurements.

The impairment circles can be used to illustrate, in a convenient and easy to use manner, the effect of an impairment of one channel on separate channels. For example, if a particular modem (e.g., modem no. 3) in channel 1 impairs the active modems in other channels, the impairment circles can illustrate this type of effect.

In this aspect of the invention, a method is provided of presenting impairment data for a data-over-cable system. The method involves generating an impairment circle comprising a circle having a perimeter divided up into a plurality of sections, each section representing a channel in a data-over-cable transmission path and each section having a plurality of divisions, each division representing a cable modem in the channel. Measurements are then made of an impairment in a first channel, with the first channel corresponding to one of the sections of the impairment circle. In the event that the measurement indicates that an impairment exists in the first channel that is affecting one or more of the other channels, a line segment is drawn on the impairment circle. The line segment is drawn between a portion of the perimeter corresponding to the cable modem that is active on the first channel the measurement is made in and a second portion of the perimeter in a second section of said impairment circle corresponding to a second channel. The line segment terminates at a portion of the perimeter in the second section at a region thereof that represents an active cable modem in the second channel.

The impairment circle with the line segment superimposed thereon is generated and presented to the user in a visually perceptible form. For example, impairment circle and line segment could be drawn by a computer and displayed on a terminal or other user interface, printed out on a piece of paper, or even drawn by hand. Preferably, the impairment circles are generated by a software program in a general-purpose computer and displayed on a terminal and printed out on a printer at the option of the user or technician. The software program could either retrieve impairment data from a data base or work in conjunction with another software program that coordinates the actual collection and storage of the impairment measurements.

BRIEF DESCRIPTION OF THE DRAWINGS

The file of this patent contains at least one drawing executed in color. Copies of this patent with color drawing(s) will be provided by the Patent and Trademark Office upon request and the payment of the necessary fee.

In the following description, reference will be made to the appended drawings, wherein like reference numbers refer to like elements in the various views, and in which.

DETAILED DESCRIPTION OF THE PREFERRED EMBODIMENT OF THE INVENTION

Several different embodiments of impairment circles will be described herein. The features of the impairment circles can vary considerably depending on the type of information that is conveyed. The impairment circle is preferably displayed on a visually perceptible medium, such as piece of paper or the screen display of a general-purpose computer. The impairment circle can be generated by hand, or, more preferably, by a graphics software program in accordance with the principles and methods described herein.

The impairment circle consists of a circle displayed on the medium, which may take the form of a template that is used over and over again, and a line segment (one or more) that is displayed on the medium and superimposed on the circle. The manner in which the line segment is drawn on the circle conveys information as to the impairment or condition being measured.

The line segment need not be drawn only when the measured condition (such as noise floor level) is of such a magnitude that it constitutes an impaired, or abnormal, condition. Rather, the line segment could be used to illustrate actual measurements, regardless of magnitude, with scale factors included in the impairment circle that would allow the operator to assess whether an actual impaired condition is present. However, some thresholding techniques could be used and only those measurements that indicate an impaired condition could be displayed in the impairment circle. In some type of impairment circles, such as the impairment circle of FIG. 3, an actual impairment may be a prerequisite in order for a line segment to be drawn on the circle in order for the impairment circle to convey useful information. Thus, considerable latitude and judgment may be employed in determining whether or not to implement a threshold (such as minimum signal to noise level) in order to display the measured condition as a line segment on the impairment circle.

In one embodiment, the line segment has a first end located on the periphery or perimeter of the circle, and a second end positioned within a region bounded by the circle's perimeter. The location of the first end of the line segment on the perimeter of the circle can convey meaning, such as the number of occurrences of the impairment, the channel the measurement is made in, or identification of a particular cable modem (or other piece of equipment) or channel that the measurements are associated with. The location of the second end of the line segment relative to the periphery of said circle conveys information as to the measurement of the impairment or other condition, such as the magnitude of the impairment or information as to which cable modems are active when the measurements are made.

The impairment (such as signal to noise ratio or noise floor level) could be measured in the cable modem termination system, for example in the demodulator module DEMOD of FIG. 1, using any convenient means. A preferred way would be to provide a signal to noise floor and noise floor or power level measurement feature as part of a cable modem termination system chip. A modest modification, within the ability of persons skilled in the art, to the cable modem termination chips commercially available from the Broadcom and Libit companies to provide such a feature may be necessary. A preferred measurement technique is described in my patent application filed concurrently, Ser. No. 09/322,513, "Method for Detecting Radio Frequency Impairments in a Data Over Cable System", incorporated by reference herein.

Figure 2:
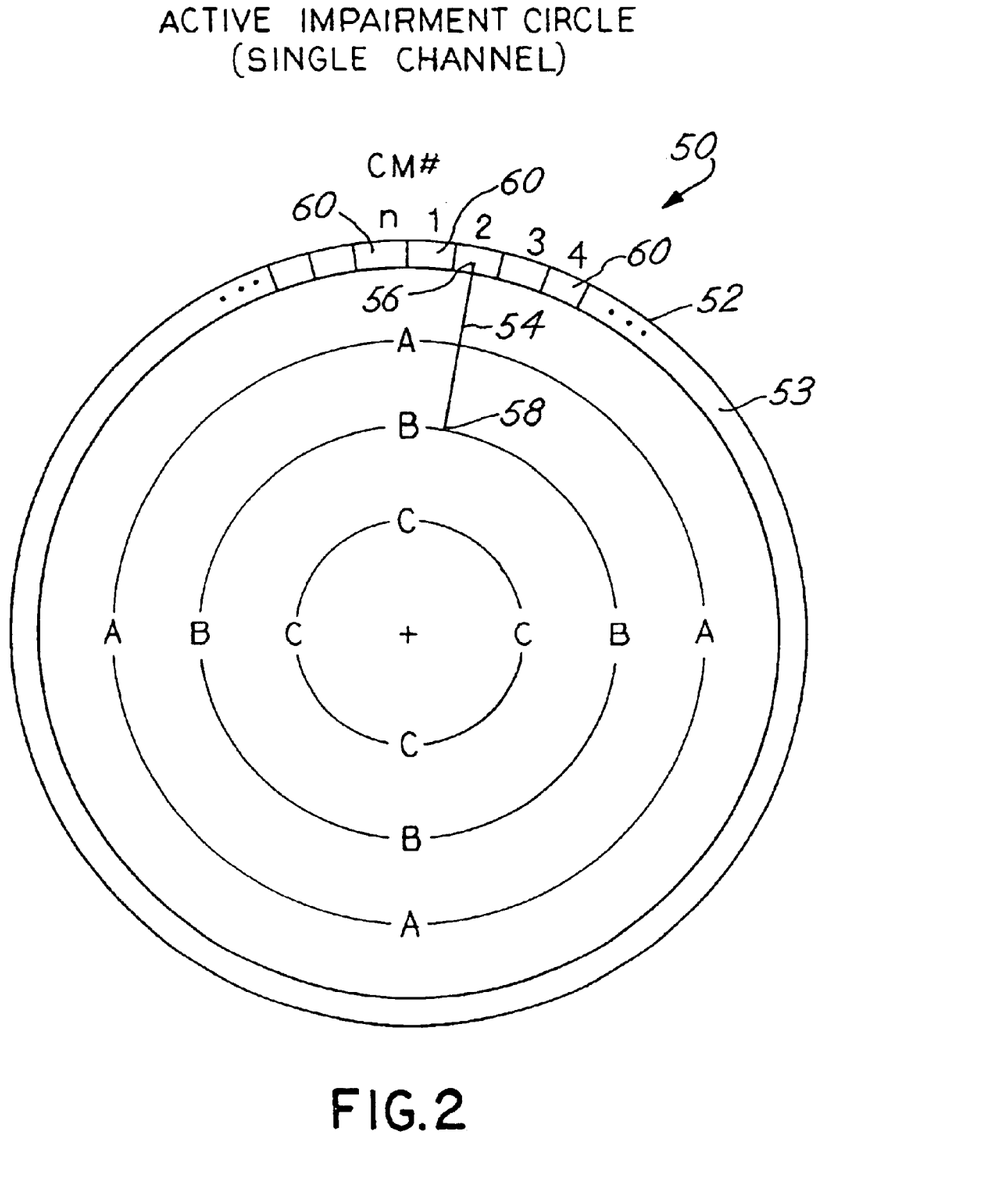
FIG. 2 is an illustration of an "active impairment circle" for measurements made in a single channel, with that channel being "active" meaning that a cable modem in that channel is transmitting in the upstream direction during the period or window in which the measurements are made.

One variety of impairment circle is illustrated in FIG. 2. FIG. 2 shows an "active impairment circle" for a single channel in a data-over-cable communications path, and in particular shows the signal-to-noise ratio of a particular cable modem in the channel. The term "active" refers to the situation where there is a cable modem transmission in the upstream channel. For the single channel case in FIG. 2, that means that that channel is active. While the impairment shown in FIG. 2 is a signal to noise ratio, other information could be extracted and displayed from the measurement, such as a noise floor level derived from the measurement.

In the embodiment of FIG. 2, the impairment circle 50 consists of a circle or ring 52 having a perimeter 53 displayed on the medium (which may take the form of a template that is used over and over again), and a line segment 54 (one or more) that is displayed on the medium and superimposed on the circle 52 that conveys information about the impairment. In the embodiment of FIG. 2, the line segment 54 has a first end 56 located on the perimeter 53 of the circle 52, and a second end 58 positioned within a region bounded by the perimeter. The second end 58 may terminate at a second location on the perimeter 53 in some embodiments, such as in the embodiment of FIG. 3 discussed subsequently. In an impairment circle of the type shown in FIG. 2, the location of the second end 58 of the line segment 54 relative to the perimeter 53 conveys information as to the measurement of the impairment or other condition, for example, the magnitude of the measurement.

In FIG. 2, concentric rings A, B and C are provided within the interior of the circle 52. The distance from the perimeter of the circle to the rings A, B and C can be used as a scale to indicate the magnitude of the impairment. In FIG. 2, the scale may indicate the level of the signal to noise ratio, noise floor during the quiet interval, or other measurement. While the letters A. B, and C are used in the figure, it will be understood that normally actual numerical values will be used instead of letters and that such numerical values will be placed adjacent to one or more rings, in order for the user to quickly understand the value of impairment that was measured. Furthermore, the number of rings in the circle 52 is arbitrary, and is provided merely for the purpose of providing some scale or reference for the location of the of the second end of the line segment 54. Fewer than three rings could be provided, as well as more rings.

The location of the first end 56 of the line segment on the perimeter of the circle 52 can also convey meaning, such as the number of occurrences, the channel the measurement is made in, or identification of a particular cable modem (or other piece of equipment) that the measurements are associated with. In the example of FIG. 2, the circle 52 is broken into n divisions 60, with each of the n divisions being associated with a different cable modem in the channel being measured. Thus, in FIG. 2, the impairment circle 50 indicates that cable modem number 2 has an average signal-to-noise ratio of level "B" (in whatever units are convenient or appropriate), and is being received in an impaired condition relative to the "quiet" level.

Additionally, the line segment 54 may have other features or characteristics that can be used to convey additional information. For example, the width of the line segment 54 may vary depending on factors such as the frequency or number of occurrences of the condition or impairment. Alternatively, different colors for multiple line segments could be used to indicate different types of impairments, or to indicate the effect of an impairment on one channel to measurements or impairments that may be present in another channel, such as in an impairment circle shown in FIG. 3. Of course, other types of distinguishing characteristics could be used, such as dashed lines, in combination with other types of features such as color, shading, thickness, etc.

Figure 4:
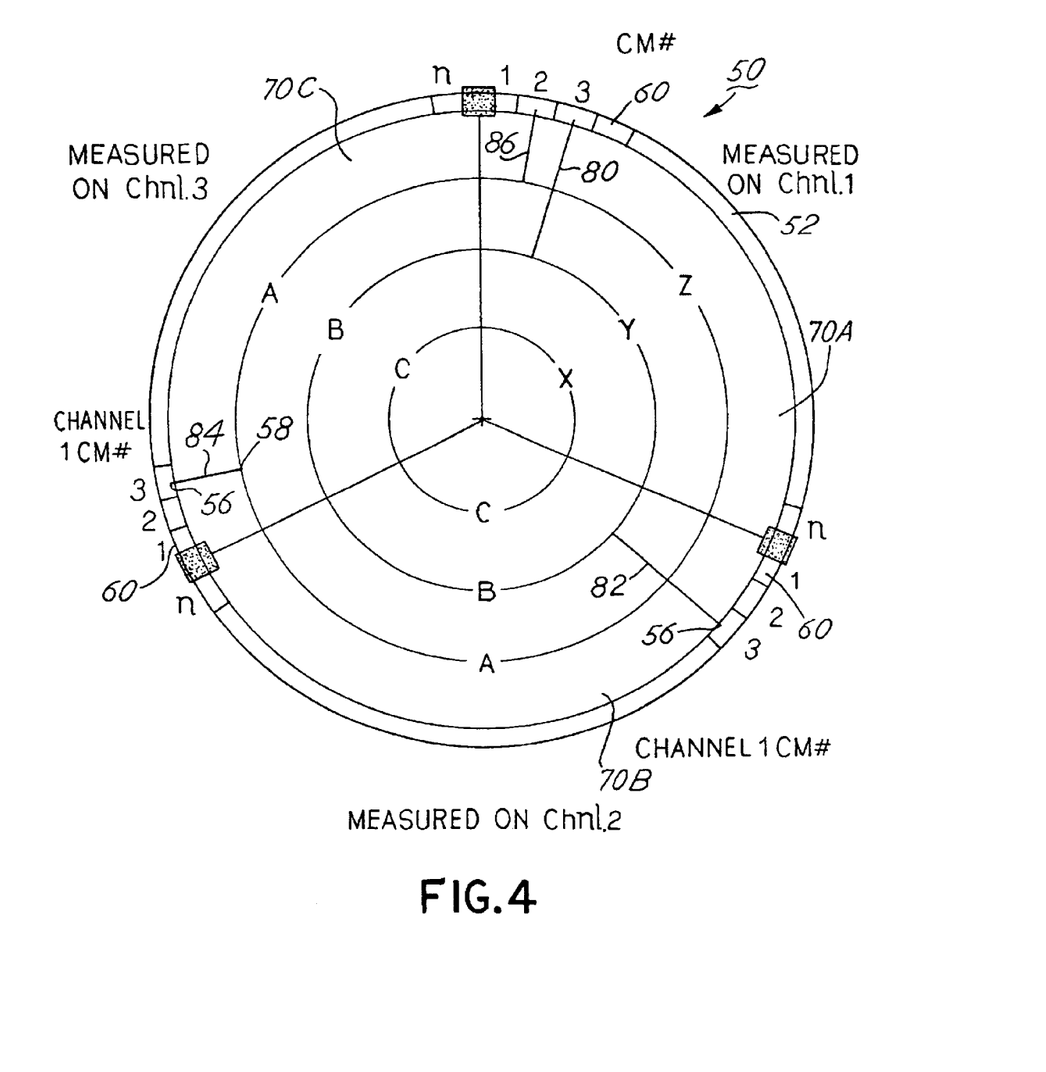
FIG. 4 is an illustration of an "single channel active impairment circle (multi-channel)", showing the impairment effect on inactive channels by an active cable modem in a different channel.

In the example of FIG. 2, the circle is not divided into sections (such as pie shaped sections as shown in FIG. 4), but modification to the circle could be performed.

In the example of FIG. 2, the line segment 54 is drawn from the cable modem that is active in that channel when an impairment occurs, towards the center of the circle 52. The larger the level of impairment (smaller the signal to noise ratio in the present example), the closer the line segment will come to the center of the circle. The width of the line segment 54 is used to indicate the quantity of impairments or occurrences over a user definable period of time. In FIG. 2, the thicker the line, the greater the number of impairments with the active cable modem no. 2. If multiple impairments are measured for a given cable modem during a measurement interval or window (ten minutes, for example), the SNR level indicated by the second end 58 of the line segment is displayed as an average of the measurements over the user defined interval.

When the impairment circle 50 is generated and displayed, it may be helpful to also include additional information on the medium such as the time the measurements were made, the scale factor used for rings A, B, C, (or more preferably, placing actual values adjacent to the rings), an indication or legend to determine a quantitative value of the number of occurrences indicated by the thickness of the line 54, and a legend applicable to the use of different colors.

Figure 3:
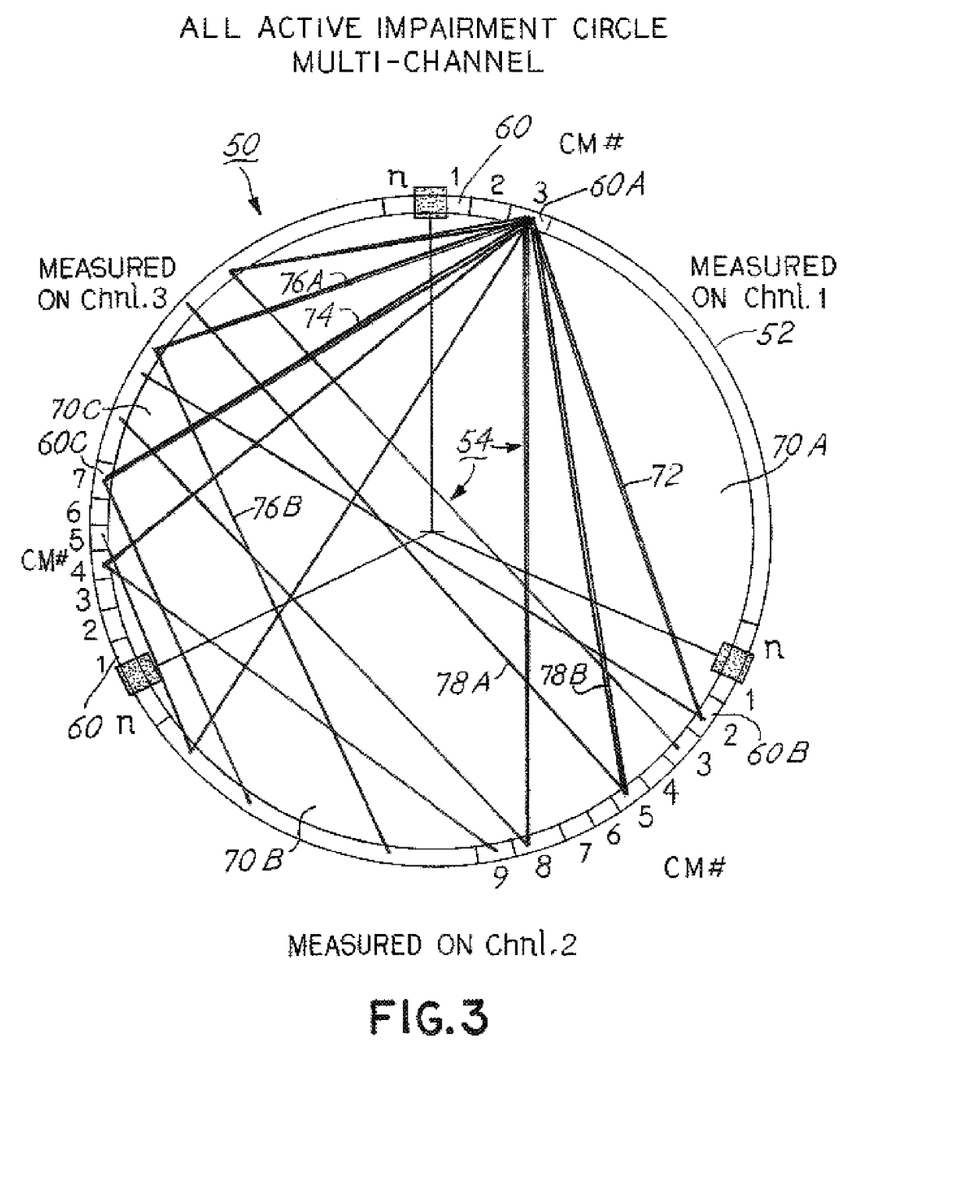
FIG. 3 is an illustration of an "all active impairment circle (multi-channel)" for a sampling of three channels in an upstream path, in which all the channels have cable modems that are currently active.

FIG. 3 is an illustration of an "all-active" impairment circle for a multi-channel situation in which all channels are active (i.e., there is a cable modem transmission on each of three upstream channels designated "Chnl 1", "Chnl 2", and "Chnl 3"). The "all active" impairment circle in this instance is divided up into three section 70A, 70B, 70C, and each section is divided up into n divisions 60, with each division representing a different cable modem in that channel. The circle 52 is split into a number of sections depending on the channels that are active, and while three such sections are illustrated in FIG. 3 it will be understood that a greater or lesser number of sections may be used.

Referring to FIG. 3, when there is an impairment measured on a given channel, a line is drawn between the division 60 for the cable modem that is active on that channel, and the division 60 for the cable modems that are active on each of the other active channels. For example, assume that there is an impairment registered or measured on channel 1, and, at that time, cable modem no. 3 is active on channel 1, cable modem no. 2 is active on channel 2 and cable modem no. 4 is active on channel 3. Thus, the impairment circle 50 includes a line segment 72 going from the division 60A for cable modem no. 3 in channel 1 to the section 60B for cable modem no. 2 in channel 2, and a line segment 74 is drawn from the division 60A for cable modem no. 3 in channel 1 to the section 60C for cable modem no. 7 in channel 3. Line segments 72 and 74 are in some sense a set and could be of one color, e.g., blue.

Lines are drawn on the impairment circle 50 whenever there is an impairment on any of the channels at the time the impairment is made or registered. The impairment may consist of, for example, a signal to noise ratio over the upstream data-over-cable transmission path exceeding a predetermined threshold. In the example of FIG. 3, use of some threshold in the signal to noise measurements, and only drawing a line if the measurement exceeds the threshold, is appropriate. Without any threshold, the lines drawn on the impairment circle would be of little or no value in tracking down the source of an impairment. Obviously, the threshold could vary, and more than one impairment circle could be drawn from a given data set, with the different impairment circles corresponding to different threshold levels in the measurements.

Thus, after some interval of time, the impairment circle may have an appearance as shown in FIG. 3. Since, over this time interval there are pairs of lines originating in each of the three pie-shaped sections 70A, 70B and 70C (e.g., 76A and 76B, 78A and 78B), and all of the pairs of lines terminate in the section 60 for cable modem no. 3 in channel 1, it indicates that all the channels are impaired when cable modem no. 3 is active. The cable modem no. 3 in channel 1 is a potential, indeed likely, source of the impairment. To aid in understanding in the example of FIG. 3 each pair of line that originates in section 70A is given one color, each pair of lines originating in section 70B is plotted or drawn in a second color different from the first color, and each pair of lines originating in section 70C is drawn in a third color different from the first and second colors.

Color for the line segments could also be used in other ways, such as drawing line segments with different colors to indicate a change over time in the number of impairments that are measured or to show a trend in the impairments (e.g., decreasing signal to noise ratio could be indicated by graduation in the color for the lines from the blue end of the spectrum to the red end of the spectrum). Such use of color would be particularly useful in an impairment circle of the type shown in FIGS. 5 or 6, or in a impairment circle wherein the location around the perimeter of the circle in which first end of the line segment is placed is used to indicate the time the measurement was made, and the colors for the lines change from the "noon" position to the final position (e.g., the six o'clock position) depending on the trend in the measurements.

FIG. 4 is an illustration of a "single channel active" impairment circle. This type of impairment circle is used when only one channel is active, and all the other channels are not active (i.e., no cable modem transmission on all other upstream channels). This impairment circle 50 has sections 70A, 70B and 70C for three different channels, 1, 2 and 3. Each section is divided into n divisions 60, each division within the section represents each cable modem on the (single) active channel, that is, channel 1 in the illustration. In addition, the circle 50 has concentric arcs "A", "B" and "C" which are used to indicate the magnitude of the noise floor of the inactive channels (channels 2 and 3), and arcs "X", "Y" and "Z" which are scale factors to show the signal to noise ratio level of the impaired transmission on the active channel (channel 1 in FIG. 4). In practice, numbers will typically be used in place of letters X, Y, and Z and A, B and C.

When there is an impairment in either signal to noise ratio or noise floor level, a line segment is drawn (within the impaired channel section 70A, 70B or 70C), from the division 60 representing the cable modem that is active during the impairment towards the center of the circle 52. The larger the impairment (e.g., smaller the signal to noise ratio or higher the noise floor level), the closer the line comes to the center of the circle. As an example, assume that cable modem no. 3 on channel 1 causes impairments on its own channel and on channels 2 and 3 when it transmits in the upstream direction. The impairment circle 50 has a line segment 80 in section 70A, showing a signal to noise level of Y. Furthermore, the impairment circle 50 has a line segment 82 in section 70B, indicating that channel no. 2 is impaired, and in particular showing that channel 2 has a noise floor level of B. Similarly, section 70C has a line segment 84 indicating that channel 3 has a noise floor level of A.

Note that in FIG. 4, the divisions 60 in the portions of the perimeter of the circle corresponding to channels 2 and 3 do not represent the cable modems in channels 2 and 3. Rather, the divisions 60 represent the cable modem number in channel 1. This is because this particular impairment circle is used when only one channel is active (channel 1 in this instance), which means by definition that channels 2 and 3 are inactive and have no cable modems transmitting in the upstream direction when the measurements are made. Also, the association of the divisions 60 in sections 70B and 70B with the cable modem in the active channel (channel 1) helps the user immediately identify which cable modem in the active channel is the source of the impairment. In this case, since the first end 56 of the line segments 82 and 84 terminate in the division 60 for cable modem no. 3, the user can quickly identify that cable modem in channel 1 as the source of the impairment.

Note further that in FIG. 4, an impairment in cable modem no. 2 of channel 1 is indicated by line segment 86 (signal to noise level of value Z). The impairment identified with cable modem no. 2 of channel 1 is not causing any impairment of channels 2 and 3. In particular, there is no line segment leading from the division 60 in sections 70B and 70C for cable modem no. 2 of channel 1 into the center of the circle.

In FIG. 4, the line width for lines 86 and 80 represents the quantity or number of occurrences. The impairment is more frequent with cable modem no. 3 in channel 1 than with cable modem no. 2 in channel 1, since line 80 is thicker than line 86. As multiple impairments occur for a given cable modem, the noise floor or signal to noise ratio levels indicated by the lines 80 and 86 will become an average of the occurrences over a user definable time period.

Figure 5:
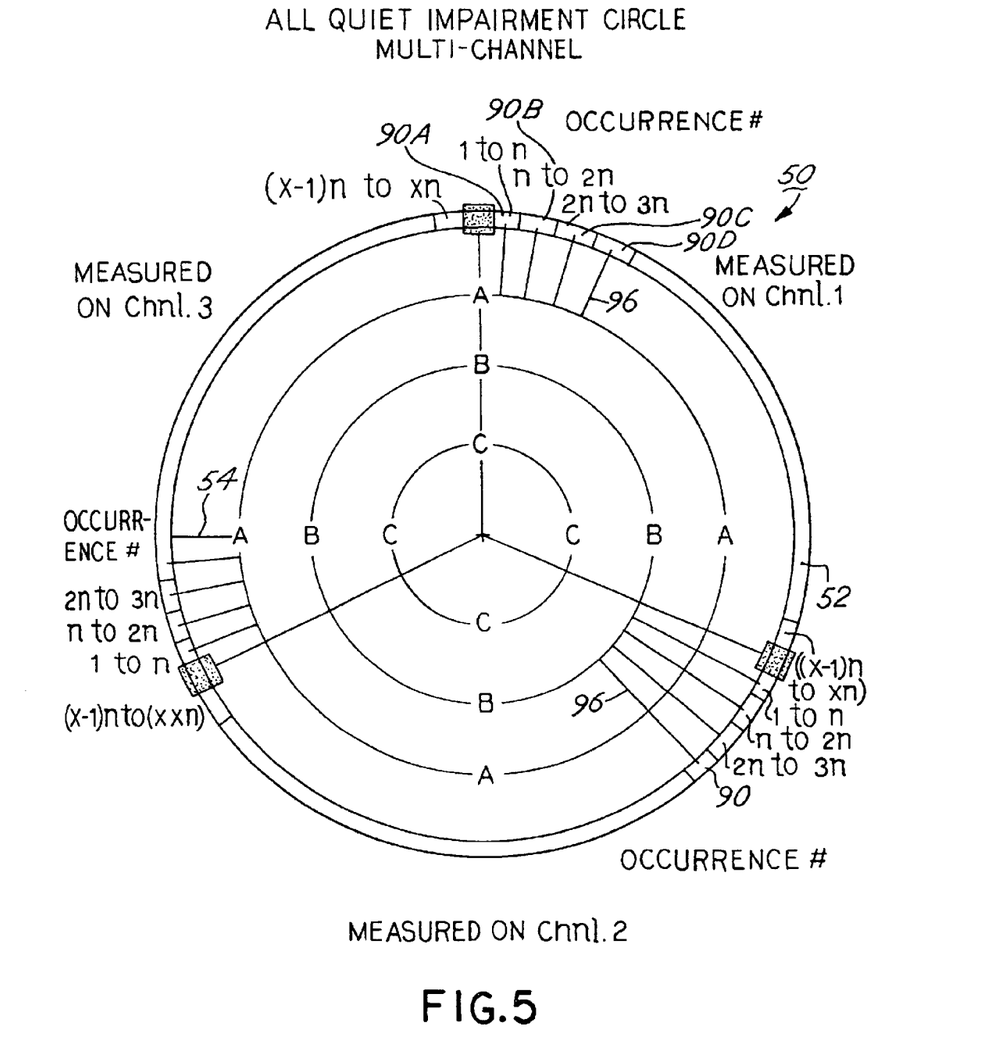
FIG. 5 is an illustration of an "all quiet impairment circle" for a sampling of three channels in an upstream path, showing the noise floor measured in the three channels when no cable modems are transmitting in the upstream direction.

Yet another type of impairment circle is shown in FIG. 5. This type of impairment circle is used to illustrate the noise floor (e.g., in units of dBmv) for three channels during an all quiet interval. This impairment circle has three sections 70A, 70B and 70C, with each section divided up into divisions 90. Each division 90 within the section represents a given amount or number of occurrences of an impairment over a user defined interval. For example, the first division 90A could be used to indicate up to n occurrences, the second division 90B could be used to indicate a number of occurrences between n and 2n, etc. The impairment circle also has concentric rings A, B and C, which indicate the magnitude of the noise floor level. For each measurement made, a line segment 96 is drawn from the appropriate division 90 for the impaired channel toward the center of the circle. The larger the level of impairment, the closer the line will come to the center of the circle. The width of the line does not convey additional information in this embodiment. Note that channels 1 and 3 have a noise floor of A dBmv, while channel 2 has a noise floor of B dBmv.

Figure 6:
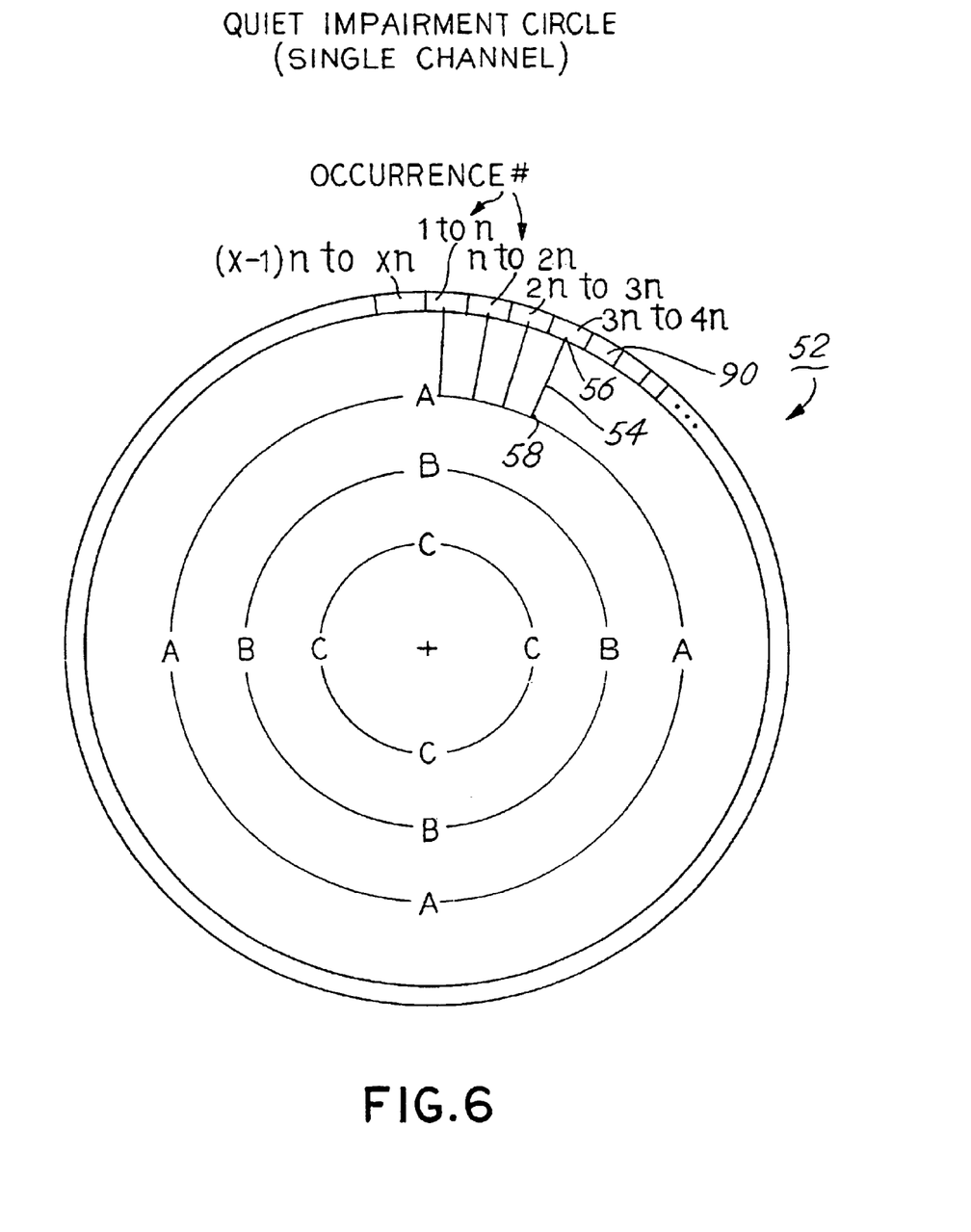
FIG. 6 is illustration of a "quiet impairment circle" for a single channel.

FIG. 6 is an illustration of an all quiet impairment circle for measurements made on a single channel. The perimeter of the channel is broken down into divisions 90. This impairment circle is basically the same as for FIG. 5 except that the circle 52 is not broken up into sections and the entire circle 52 has divisions representing the number of occurrences on the channel. For FIG. 6, as for FIG. 5, if a division 90 represents a number of occurrences rather than a single occurrence (i.e., n is some integer greater than 1 in FIGS. 5 and 6), then the noise floor value indicated is preferably the average noise floor value for all the occurrences in that division. Some other criteria could be chosen instead, of course, such as mean, median, weighted average, etc. Note also that in the example of FIG. 6, the measure merits represented by the line segments are actual measured conditions, and no threshholding techniques are used.

Thus, in accordance with the invention, a method is provided of displaying impairment data for a data-over-cable system, comprising the steps of making a measurement of an impairment on a channel of a cable modem transmission path (the manner in which the measurement is made is completely unimportant) and representing the measurement as a line segment in an impairment circle. The impairment circle has a perimeter and a center. The line segment has a first end on the perimeter (or, equivalently, in close proximity to the perimeter) and a second end either within the area bounded by the perimeter or on the perimeter. The location of the second end of the line segment indicates the magnitude of the measurement or some other information about the impairment, such as other cable modems that are active in the upstream path during the occurrence of the impairment.

The method may also further comprises the step of making a second measurement of an impairment on a second channel (such as shown in FIG. 3 or FIG. 4) and representing the second measurement as a second line segment in the impairment circle. The second line segment has a first end on the perimeter and a second end within the area bounded by the perimeter. The location of the second end of the second line segment indicates the magnitude of the second measurement (e.g., FIG. 4) or some other information such as in FIG. 3. The number of channels included in the impairment circle is scalable and can vary. Usually there will be less than 10 channels. The perimeter of the circle may be divided up into divisions, with each division associated with a cable modem in that channel. The number of divisions is also arbitrary, and could be as large as a hundred or more, or even greater.

A third measurement of an impairment on a third channel of said cable modem transmission path can be made, such as the measurement indicated by line 84 in FIG. 4. The third measurement is represented as a third line segment 84 in the impairment circle 50, wherein the third line segment has a first end 56 on the perimeter in a third region or section 70C of the impairment circle 50 and a second end 58 within the area bounded by the perimeter of the circle 52. The location of the second end 58 of the third line segment 84 within the circle 50 indicates the magnitude of the third measurement.

With reference to FIG. 3, we have also described herein a method of presenting impairment data for a data-over-cable system, comprising the steps of:

(a) generating an impairment circle 50, the impairment circle 50 comprising a circle 52 divided up into a plurality of sections 70A, 70B and 70C, each section representing a channel in a data-over-cable transmission path and each section having a plurality of divisions 60, each division representing a cable modem in its respective channel, (b) making a measurement of an impairment in a first channel in the data-over-cable transmission path, the first channel corresponding to one of the sections (e.g., 70A) of the impairment circle 70A;

(c) in the event that the measurement indicates that an impairment exists in the channel (channel 1 in FIG. 3), drawing a line segment 72 between a portion of the perimeter corresponding to the cable modem that is active on the first channel the measurement is associated with (cable modem no. 3 of channel 1) and a second portion of the perimeter in a second section (70B) of the impairment circle corresponding to a second channel (channel 2), wherein the line segment terminates at a portion of the perimeter in the second section 70B at a region thereof that represents an active cable modem in the second channel (cable modem no. 2 in channel 2); and (d) presenting the impairment circle with the line segment 72 superimposed thereon in a visually perceptible form, such as with the aid of a graphical user interface or paper.

In plotting the data in the fashion described above, patterns will arise in the circles that will point to the cause of the problem. For example, if a single cable modem is the cause of the impairment, the majority of lines will emanate from that cable modem, while other cable modems on that or other channels will have more of a random pattern. See FIG. 3, and the concentration of line segments having an end point at cable modem no. 3 of channel 1. There may be cases where the "all active" impairment circle has no discernable pattern due to impairments being on multiple channels or where an impairment impacts all the cable modems on the channel. In those cases, the "all quiet" or "single channel active" impairment circles (FIGS. 4, 5 and 6) will show a pattern that will point to the source of the problem. Thus, each impairment circle has its own role to play in interpretation of the data, but will reveal certain impairments that may not be discernable in other impairment circles. Combinations of different types of impairment circles may be needed to isolate the source of the impairment. Additional impairment circles will also be needed to interpret patterns that occur on the "all active" impairment circle (FIG. 3) when the pattern is attributable to multiple causes.

All the impairment circles will present data that represents a given time duration or window (one hour, or ten minutes being two possible examples). Any measurements, such as the number of occurrences for line width, and average impairment level, would be calculated based on the data collected within the window. As any of the data point's edges exceeded the user defined window, they would be removed and the values would be recalculated. In a software based implementation of the invention in which the impairment circles are generated by computer and displayed on a screen or other graphical user interface, the user preferably would be able to scroll up and down in time (or otherwise change and select a new time period to display) with the lines on the impairment circle redrawn based on the data that falls within the new time period selected. Likewise, the duration or hold window or the threshold could also be increased or decreased with the impairment circle redrawn to represent the new data set. These features will enable the user to get a clearer understanding of the nature of the impairment on the upstream network. The method may also be practiced by generating the impairment circle with the aid of a computer and printing the impairment circle on a piece of paper with a printer coupled to the computer.

Thus, it will be appreciated that a preferred embodiment of the invention will use a general purpose computer to store the impairment data, with a software program written to organize the data in the manner required (by channel, modem, time period, etc.). The software program with either contain specific routines for generating the impairment circles in a visually perceptible manner on the terminal or by printing them out on paper or both. Alternatively, the software program may use commercially available drawing programs to draw the circle, add the divisions or sections, and draw lines as described above to indicate the impairments measured. The program could either process already collected impairment data stored in a data base or work in tandem with a CMTS (such as the DEMOD circuit, chip or electronics of FIG. 1) and coordinate the extraction and storage of impairment data and generate impairment circles in real time or later. Persons skilled in the art of graphics software programming and familiar with cable modem termination systems and related fields should be able to write such a program from the instant disclosure by an exercise of ordinary effort.

As a further variation, the concentric rings (A, B, C) shown in the Figures could be placed outside of the circle 52 per se with the line segment going from the perimeter to the concentric ring applicable to the measurement. There could be any number of concentric rings outside the perimeter of the circle 52. As yet another variation, the line segment 54 could be drawn such that one end thereof is located at the center of the circle and the second end thereof is in the direction of the perimeter and in the pie-shaped sliver that corresponds to a particular division 60 (representing a given cable modem in a channel). These and still other similar variations and modifications are all considered equivalent to the disclosed embodiments and within the scope of the invention.

While the preferred embodiments have been described with particularity, it will be appreciated that variations from the disclosed embodiments and different types of impairment circles could be generated without departure from the true spirit and scope of the invention. This true spirit and scope of the invention will be found by reference to the appended claims, interpreted in light of the foregoing description and drawings.

I claim:

1. A method of presenting data representing a condition in a channel of a cable modem transmission path of a data-over-cable system, comprising the steps of:

making a measurement of said condition; and representing said measurement as a line segment in an impairment circle having a perimeter and a center, wherein said line segment has a first end on said perimeter and a second end, and wherein the location of said second end of said line segment relative to said perimeter conveys information regarding said measurement;

wherein the perimeter of said circle is separated into discrete regions, each region representing a channel, and wherein each region is further divided into multiple divisions, each division representing a different cable modem in said channel.

2. The method of claim 1, wherein said first end of said first line segment is located in a first region of said perimeter, and wherein the method further comprises the steps of:

making a second measurement of a condition in a second channel of said cable modem transmission path, and representing said second measurement as a second line segment in an impairment circle, wherein said second line segment has a first end on said perimeter in a second region of said impairment circle, and a second end, and wherein the location of said second end of said second line segment relative to said perimeter conveys information regarding said second measurement.

3. The method of claim 2, wherein the method further comprises the steps of making a third measurement of a condition in a third channel of said cable modem transmission path, and representing said third measurement as a third line segment in said impairment circle, wherein said third line segment has a first end on said perimeter in a third region of said impairment circle, and a second end, and wherein the location of said second end of said third line segment relative to said perimeter conveys information regarding said third measurement.

4. The method as claimed in claim 2, wherein said first line segment is represented in a first color and wherein said second line segment is represented in a second color different from said first color.

5. The method as claimed in any one of claims 1–3, wherein said first measurement comprises a measurement of the noise floor in said transmission path.

6. The method as claimed in any one of claims 1–3, wherein said first measurement comprises a measurement of the signal to noise ratio of said transmission path.

7. The method as claimed in any one of claims 1–3, wherein said impairment circle is generated by a computer having a graphical user interface and displayed on said interface.

8. The method as claimed in any one of claims 1–3, wherein the method further comprises the steps of generating said impairment circle by a computer and printing said impairment circle on a piece of paper with a printer coupled to said computer.

9. The method as claimed in any one of claims 1–3, wherein said impairment circle further comprises a second circle concentric with respect to and located within said perimeter of said impairment circle, said second circle for indicating a magnitude of said first measurement.

10. A method of presenting impairment data for a data-over-cable system, comprising the steps of:

generating an impairment circle, said impairment circle comprising a circle having a perimeter divided up into a plurality of sections, each section representing a channel in a data-over-cable transmission path and each section having a plurality of divisions, each division representing a cable modem in said channel, making a measurement of an impairment in a first channel in said data-over-cable transmission path, said first channel corresponding to one of said sections of said impairment circle;

drawing a line segment on said impairment circle between a portion of the perimeter corresponding to the cable modem that is active on the first channel the measurement is made in and a second portion of said perimeter in a second section of said impairment circle corresponding to said second channel, wherein said line segment terminates at a portion of said perimeter in said second section at a region thereof that represents an active cable modem in said second channel; and presenting said impairment circle with said line segment superimposed thereon to a user in a visually perceptible form.

11. The method of claim 10, wherein said impairment is associated with a signal to noise ratio.

12. The method of claim 10, wherein said step of generating said impairment circle and drawing said line segment are performed by a general purpose computer.

13. The method of claim 12, wherein said general purpose computer presents said impairment circle with said line segment superimposed thereon on a graphical user interface connected to said general purpose computer.

14. The method of claim 10, wherein a plurality of line segments are superimposed on said circle, said plurality of line segments originating in a first section and a second section of said circle, and wherein said line segments originating in said first section are represented in a first color and wherein said line segments drawn in said second section are represented in a second color, said first color different from said second color.

15. A method of presenting data representing a condition in a channel of a cable modem transmission path of a data-over-cable system, comprising the steps of:

making a measurement of said condition; and representing said measurement as a line segment in an impairment circle having a perimeter and a center, wherein said line segment has a first end on said perimeter and a second end, and wherein the location of said second end of said line segment relative to said perimeter conveys information regarding said measurement;

wherein the method further comprises the steps of making measurements of said impairment over a predetermined period of time, and varying the width of said line segment depending on the number of occurrences of said impairment over said predetermined period of time.

16. Apparatus for displaying a measurement of an impairment or other condition in a data-over-cable system, comprising:

a visually perceptible medium, a circle displayed on said medium, and a line segment displayed on said medium superimposed on said circle, said line segment having first and second ends, said first end of said line segment located on the periphery of said circle and said second end positioned either on said periphery of said circle or within a region bounded by said circle, with the location of second ends relative to said periphery of said circle conveying information as to said measurement of said impairment or other condition;

wherein said perimeter of said circle is divided in to a plurality of sections, each section corresponding to a channel of said data-over-cable system.

17. The apparatus of claim 16, wherein each of said sections is further divided into a plurality of divisions, each division corresponding to a different cable modem.

18. A method of presenting data representing a condition in a channel of a cable modem transmission path of a data-over-cable system, comprising the steps of:

making a measurement of said condition; and representing said measurement as a line segment in an impairment circle having a perimeter and a center, wherein said line segment has a first end on said perimeter and a second end, and wherein the location of said second end of said line segment relative to said perimeter conveys information regarding said measurement;

wherein said perimeter of said circle is divided into a plurality of divisions, and wherein each division is associated with a number of occurrences measured during a user-defined period of time.

19. A machine-readable storage medium containing a set of instructions for a general purpose computer, said set of instruction comprising a set of instructions processing measurements of impairments or other conditions in a data-over-cable transmission path and responsively plotting said measurements in a human-perceptible form as a line segment having first and second ends superimposed on a circle, with the location of said first and second ends of said line segment relative to said circle conveying information as to said measurements;

wherein said circle is divided into a plurality of divisions, and wherein each division is associated with a number of occurrences measured during a user-defined period of time.

20. A machine-readable storage medium containing a set of instructions for a general purpose computer, said set of instruction comprising a set of instructions processing measurements of impairments or other conditions in a data-over-cable transmission path and responsively plotting said measurements in a human-perceptible form as a line segment having first and second ends superimposed on a circle, with the location of said first and second ends of said line segment relative to said circle conveying information as to said measurements:

wherein said set of instructions is integrated with a software program running in cable modem termination system; and wherein said circle is divided into a plurality of divisions, and wherein each division is associated with a number of occurrences measured during a user-defined period of time.

21. A machine readable storage medium containing a computer software program for use in displaying on a visually perceptible medium displaying a template for an impairment circle for a data-over-cable system, said program comprising instructions for generating said template having the form comprising:

a marking forming a circle, said circle divided into a plurality of divisions, each division for one cable modem of a channel in said data over cable system; and said marking forming said circle further divided into a plurality of sections, each section including a group of said divisions, wherein each of said sections is associated with a separate channel in said data over cable system, and markings forming one or more concentric circles within said circle, said one or more concentric circles associated with a magnitude of a measurement to be made associated with one or more of said cable modems.

22. A machine readable storage medium containing a computer software program for use in displaying on a visually perceptible medium a template for an impairment circle for a data-over-cable system, said program comprising instructions for generating said template having the form comprising:

a marking forming an outer circle, said outer circle divided into a plurality of divisions, each division corresponding to a number of occurrences, of an impairment measured in a channel of said data-over-cable system; and markings forming one or more concentric circles within said outer circle, said one or more concentric circles associated with a magnitude of a measurement to be made associated with one or more of said cable modems;

wherein said marking forming said outer circle is further divided into a plurality of sections, each section including a group of said divisions, wherein each of said sections is associated with a separate channel in said data over cable system.

* * * * *